United States Patent [19]

Nagai et al.

[11] Patent Number: 4,659,386
[45] Date of Patent: Apr. 21, 1987

[54] PROCESS FOR PRODUCING LIGHTWEIGHT CALCIUM SILICATE ARTICLES

[75] Inventors: Shoichi Nagai; Saburo Hiraoka; Shinji Hama; Mitsuo Senga, all of Nagoya, Japan

[73] Assignee: Mitsubishi Rayon Co., Ltd., Tokyo, Japan

[21] Appl. No.: 826,906

[22] Filed: Feb. 6, 1986

[30] Foreign Application Priority Data

Feb. 25, 1985 [JP] Japan ................................. 60-35591

[51] Int. Cl.$^4$ .............................................. C04B 7/34
[52] U.S. Cl. ...................... 106/120; 252/62; 427/403
[58] Field of Search ................ 106/120; 427/403; 252/62

[56] References Cited

U.S. PATENT DOCUMENTS 3,901,991  8/1975  Ueda et al. .......................... 106/120
4,101,335  7/1978  Barrable ............................. 106/120

FOREIGN PATENT DOCUMENTS 59-232954  12/1984  Japan ................................. 106/120

Primary Examiner—William R. Dixon, Jr.
Assistant Examiner—Steven Capella
Attorney, Agent, or Firm—Oblon, Fisher, Spivak, McClelland & Maier

[57] ABSTRACT

A process for producing steam-cured lightweight calcium silicate articles superior in productivity, homogeneity, and mechanical strength by using a powdery siliceous material, powdery calcareous material, and cellulose pulp as main raw materials, which process comprises mixing short acrylic fibers of 1 to 10 mm in filament length to which an organic silicon compound has adhered, into a slurried mixture of said raw materials.

6 Claims, No Drawings

PROCESS FOR PRODUCING LIGHTWEIGHT CALCIUM SILICATE ARTICLES

INDUSTRIAL APPLICATION FIELDS

The present invention relates to a process for producing steam-cured lightweight calcium silicate articles superior in productivity, homogeneity, and mechanical strength.

PRIOR ART

Conventional processes for producing steam-cured lightweight calcium silicate articles comprise the following steps:
(i) mixing and grinding of a siliceous material (silica sand, diatomaceous earth, or other mineral silica) and a calcareous material (lime or gypsum),
(ii) admixing of asbestos fibers,
(iii) admixing of water in a suitable proportion to form a slurry,
(iv) filtration to remove water and make the whole material semi-plastic, and
(v) high-temperature steam curing of the semi-plastic matter in an autoclave.

In these processes, asbestos fibers have long been used in large quantities because of their eminent properties such as affinity for the other inorganic raw materials, filterability for water removal, heat resistance, and alkali resistance and because of their low price. However, it has been revealed in recent years that asbestos fibers are carcinogenic, and from the standpoint of industrial hygiene and environmental preservation, European and American countries are going to prohibit the use of asbestos fibers by law. Thus it is desired intensely to develop fibers substitutive for asbestos fibers.

Various kinds of fibers were already proposed as substitutes for asbestos fibers, which include synthetic fibers, e.g. polypropylene, polyamide, polyester, and poly(vinyl alcohol) fibers, cellulosic fibers, cellulose pulp, and inorganic fibers, e.g. glass, carbon, and steel fibers. However, the fibers to be used as substitutes for asbestos fibers in the production of high-temperature cured lightweight calcium silicate articles need to be superior particularly in such characteristics as the ability to be dehydrated, heat resistance, and alkali resistance, in addition to affinity for the inorganic raw materials. Cellulose pulp is a relatively cheap fibrous material substitutive for asbestos fibers but is inferior in dispersibility and in the ability to be dehydrated and is insufficient in reinforcing effect.

The present inventors made intensive studies aiming at solving such problems associated with fibers substitutive for asbestos fibers and at finding out a process for producing steam-cured lightweight calcium silicate articles superior in productivity, homogeneity, and mechanical strength. As a result the present invention has been accomplished.

Problems to Solve According to the Invention

An object of the present invention is to provide a process for producing steam-cured lightweight calcium silicate articles superior in productivity, homogeneity, and mechanical strength.

Means of Solving Problems

The substance of the present invention is a process for producing steam-cured lightweight calcium silicate articles by using a powdery siliceous material, powdery calcareous material, and cellulose pulp as main raw materials, said process comprising mixing short acrylic fibers of 1 to 10 mm in filament length to which an organic silicon compound has adhered, into a slurried mixture of said raw materials.

Suitable acrylic fibers for use in the process of the present invention contain at least 30% by weight of acrylonitrile, possess sizes of 0.1 to 30 d, preferably 0.1 to 5.0 d, and filament lengths of 1 to 10 mm, and have 0.01 to 4% by weight owf of an organic silicon compound adhering thereto.

If the used acrylic fibers contain less acrylonitrile than 30% by weight, the hydrolysis product of cyano groups in the fibers will be formed in such small amounts during the steam curing step that the fibers will have little reinforcing effect on the lightweight calcium silicate articles.

The fiber length is desired to be in the range of 1 to 10 mm. If the length of the used acrylic fibers is less than 1 mm, the filterability of the slurried material for water removal will be deteriorated and the productivity will be lowered. On the other hand, if the fiber length exceeds 10 mm, the entanglement of fibers resulting from stirring in the slurry formation will develop flucculent agglomerates so that uniform mixing of the fibers with the inorganic feedstock will be difficult and the resulting lightweight calcium silicate article will have uneven quality. Preferably the fiber length is in the range of 1.5 to 5 mm.

The organic silicon compound used to adhere to the acrylic fibers is composed mainly of dimethylpolysiloxane though it is possible to use methylphenylpolysiloxane, methylhydrogenpolysiloxane, alkylpolysiloxane containing alkylene oxide groups, or the like.

Suitable adhesion amounts of the silicon compound are in the range of 0.01 to 4% by weight owf. The adhesion of such an organic silicon compound increases greatly the uniformity of mixing the fibers into the slurry of materials and this is accompanied by much improvements in the dehydration ability and in strengths, e.g. flexural and impact strengths, of the resulting lightweight calcium silicate article.

On adhering in amounts less than 0.01% by weight owf, the organic silicon compound has undesirably little improving effect on the processability or productivity as well as on the performance characteristics of the product. Adhesion amounts of the silicon compound exceeding 4% by weight are economically undesirable, since the improving effect is no longer proportional to the adhesion amount.

Subsequently the slurried mixture of the short acrylic fibers and other feed materials is filtered to remove water. The resulting semi-plastic matter is charged in an autoclave and then steam-cured at a high temperature, whereby the cyano groups in the short acrylic fibers are converted by hydrolysis into carboxyl groups via acid amide groups. It is considered that these carboxyl groups will form ionic bonds with calcium atoms in the calcareous feed material with the result that the lightweight calcium silicate article will be much improved in flexural and impact strengths. In this process the short acrylic fibers and cellulose pulp are used in a total amount of 2 to 6% by weight (based on solids) and the weight ratio of the acrylic fiber to the cellulose pulp is desirably in the range of ½ to 1/5.

The siliceous material used as a main feed for the lightweight calcium silicate articles is, for example, mineral silica, diatomaceous earth, silica sand, blast furnace slag, or fly ash. There is no particular restriction on the calcareous material used as another main feed so far as it is a generally used material such as lime or gypsum. The mixture of the feed materials may be stirred by any of common agitators such as paddle, propeller, and pot types of agitators.

The high-temperature curing in an autoclave can be performed under generally applied conditions, for instance, using saturated steam of a gage pressure of 11 Kg/cm$^2$ and temperature of 180° C.

The lightweight calcium silicate articles produced by high-temperature steam curing according to the present invention have superior productivity, homogeneity, and mechanical strength, which are by no means inferior to those of the convential ones reinforced with asbestos fibers. Thus the present lightweight calcium silicate articles are useful as building materials such as wall materials, floorings, and boards and civil engineering materials.

EXAMPLES

The present invention is illustrated with reference to the following examples. In the examples, the felxural and impact strengths of lightweight calcium silicate boards were measured in the following ways. Measurement of flexural strength:

A test piece 15 cm long and 4 cm wide was placed on two fulcra (10 cm span), then force was applied on the center line by a loading body of which the curvature radius is 2.5 cm, and the load (F) required to break the test piece was measured by using a large size Tensiron universal tester model UTM-25T (supplied by Toyo-Baldwin Co., Ltd). The flexural strength (B) was calculated from the found load (F) according to the following equation:

$$B(Kg/cm^2) = \frac{3}{2} \cdot \frac{FL}{bt^2}$$

wherein
F: Load (Kg) at break
L: Span (10 cm) between fulcra
b: Width (4 cm) of test piece
t: Thickness (cm) of test piece.

Measurement of impact strength

A test piece 10 cm long, 2 cm wide, and 1 cm thick was placed on a horizontal surface of sands. A steel ball weighing 36 g was caused to fall on the center of the test piece.

The impact strength is represented by the minimum ball-falling height that caused a break of the test piece.

EXAMPLE 1

Tows of acrylic fibers Vonnel V 17 (registered tradename, supplied by Mitsubishi Rayon Co., Ltd.) of 1.5 d in size were scoured by using an Obermaier dyeing machine. After adhesion of 0.2 wt % owf of Shinetsu Silicone KM-83 (an organic silicon compound composed mainly of dimethylpolysiloxane supplied by Shinetsu Chemicals Co., Ltd.), the tows were cut by a cutter to give short acrylic fibers having a definite length of 3 mm. One part by weight (hereinafter "part(s) by weight" is abbreviated as "part(s)") of the short acrylic fibers, 4 parts of cotton pulp, and 200 parts of water were added to a mixture of powdery siliceous materials (9.4 parts of silica sand and 7.0 parts of wollastonite) and powdery calcareous materials (18.8 parts of slaked lime and 4.7 parts of gypsum). The resulting mixture was stirred in a mixer to form a uniform slurry, which was then poured into a mold (12.5 g/cm$^2$). A pressure of 2 Kg/cm$^2$ was applied to the slurry in the mold through a 60- mesh wire gauze, whereby the slurry could be dehydrated in 2.8 minutes to give a 2.5-cm thick flat board of semi-plastic material.

This board was subjected to high-temperature steam curing for 6.5 hours in saturated steam at 180° C. to yield a steam-cured lightweight calcium silicate board.

For comparison, a slurry was prepared according to the above procedure by using 1 part of Minelon (registered tradename of glass fibers having a size of about 6 d and a length of 15 mm, supplied by Nihon Vulcar Co., Ltd.) in place of the above short acrylic fibers. The slurry was dehydrated by applying similarly a pressure of 2 Kg/cm$^2$ to give a 2.5- cm thick flat board of semi-plastic material, where the dehydration required 4 minutes.

This board was subjected to high-temperature steam curing for 6.5 hours in saturated steam at 180° C, to yield a steam-cured lightweight calcium silicate board containing glass fibers/cotton pulp.

For further comparison, steam-cured lightweight calcium silicate boards of two different compositions were made according to the above procedure by using 5 parts of cotton pulp and 10 parts of asbestos fibers, respectively, in place of 1 part of the short acrylic fibers and 4 parts of the cotton pulp.

Table 1 shows the dehydration times in making the above four types of steam-cured lightweight calcium silicate boards and the found flexural strengths of theses boards.

TABLE 1

|  | Fibrous material used | Mixing proportion (part by wt) | Dehydration time (min) | Flexural strength (Kg/cm$^2$) |
|---|---|---|---|---|
| Example 1 according to present invention | Short acrylic fibers | 1 | 2.8 | 81 |
|  | Cotton-pulp | 4 |  |  |
| Comparative Example | glass fibers | 1 | 4.0 | 56 |
|  | Cotton pulp | 4 |  |  |
| Comparative Example | Cotton pulp | 5 | 4.2 | 55 |
| Comparative Example | Asbestos fibers | 10 | 2.6 | 82 |

The time for dehydrating the slurry of the present invention containing 1 part of short acrylic fibers to which an organic silicone oil had adhered and 4 parts of cotton pulp was as short as 2.8/4 of the time for dehydrating the slurry of a comparative example containing 1 part of glass fibers and 4 parts of cotton pulp, 2.8/4.2 of the time for dehydrating the slurry of another comparative example containing 5 parts of cotton pulp and was nearly equal to the time for dehydrating the slurry of a further comparative example containing 10 parts of asbestos fibers.

As regards the flexural strength of lightweight calcium silicate boards, the product of the present invention reinforced with 1 part of said short acrylic fibers and with 4 parts of cotton pulp was much superior to the product of a comparative example reinforced with 1 part of glass fibers and with 4 parts of cotton pulp and to the product of another example reinforced with 5 parts of cotton pulp and was equivalent to the product of a further comparative example reinforced with 10 parts of asbestos fibers.

It can be seen from these results that the incorporation of a mixture of specific short acrylic fibers and cotton pulp exhibits synergistic effect which is an object of the present invention.

EXAMPLE 2

In the production of acrylic fibers Vonnel 17 (registered tradename, supplied by Mitsubishi Rayon Co., Ltd), spun and stretched filaments were treated with NUC Silicone FZ-328 (an organic silicon compound composed mainly of dimethylpolysiloxane, supplied by Nihon Unicar Co., Ltd.) in the oil treatment step, causing 1% by weight owf of the silicone to adhere to the filaments. Then the filaments were dried and heat-treated to give tows of V 17 having a size of 1.5 d, which were then cut by a cutter to a definite fiber length of 3 mm, giving short acrylic fibers to which an organic silicon compound had adhered.

Then, 1.5 parts of these short acrylic fibers and 3.5 parts of cotton pulp were incorporated into the same mixture of powdery siliceous materials with powdery calcareous materials as used in Example 1, to form a slurry, which was then dehydrated and subjected to high-temperature steam curing, in the same manner as in Example 1, to yield a lightweight calcium silicate board.

For comparison, a high-temperature steam-cured lightweight calcium silicate board was made by following the procedure of Example 2 except that 1.5 parts of short acrylic fibers having a size of 1.5 d and a filament length of 3 mm which were not subjected to any organic silicone compound adhesion treatment were used in place of the above short acrylic fibers to which an organic silicon compound had adhered.

Table 2 shows results of measuring the flexural and impact strengths of the above steam-cured lightweight calcium silicate boards.

TABLE 2

|  | Adhesion treatment with organic silicone oil | Flexural strength (Kg/cm$^2$) | Impact strength (cm) |
| --- | --- | --- | --- |
| Example 2 according to present invention | Yes | 83 | 35 |
| Comparative example | No | 78 | 26 |

It can be seen from Table II that the board obtained according to the present invention by using short acrylic fibers to which an organic silicon compound has adhered, as compared with the board obtained by using short acrylic fibers which have not been subjected to any organic silicon compound adhesion treatment, has been improved in both flexural strength and impact strength, specially in the latter, and thus the treatment with an organic silicon compound is effective.

Effect of the Invention

According to the present invention, it is possible to provide lightweight calcium silicate products containing no asbestos fiber which have excellent performance characteristics as well as suitability for making high-temperature steam-cured lightweight calcium silicate articles desired hitherto intensely, by using, jointly with cellulose pulp, short acrylic fibers having a filament length of 1 to 10 mm to which an organic silicon compound has adhered.

What is claimed is:

1. A process for producing steam-cured lightweight calcium silicate articles by using a powdery siliceous material, powdery calcareous material, and cellulose pulp as main raw materials, said process comprising mixing short acrylic fibers of 1 to 10 mm in fiber length to which an organic silicon compound has adhered, into a slurried mixture of said raw materials.

2. The process of claim 1, wherein the short acrylic fibers have the adhering organic silicon compound in an amount of 0.01 to 4% by weight owf.

3. The process of claim 2, wherein the organic silicon compound is dimethyl polysiloxane.

4. The process of claim 1, wherein the short acrylic fibers have a size of 0.1 to 30 d.

5. The process of claim 1, wherein the total amount of the cellulose pulp and the short acrylic fibers is from 2 to 6% by weight based on the whole solid component.

6. The process of claim 5, wherein the mixing ratio of the short acrylic fibers to the cellulose pulp is from ½ to 1/5 by weight.

* * * * *